United States Patent
Guan et al.

(10) Patent No.: US 12,146,797 B2
(45) Date of Patent: Nov. 19, 2024

(54) DETECTION SYSTEM AND WIND DRIVEN GENERATOR

(71) Applicant: Schaeffler Technologies AG & Co. KG, Herzogenaurach (DE)

(72) Inventors: Ran Guan, Shanghai (CN); Aiping Wang, Suzhou (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 673 days.

(21) Appl. No.: 17/416,657

(22) PCT Filed: Dec. 20, 2018

(86) PCT No.: PCT/CN2018/122426
§ 371 (c)(1),
(2) Date: Jun. 21, 2021

(87) PCT Pub. No.: WO2020/124503
PCT Pub. Date: Jun. 25, 2020

(65) Prior Publication Data
US 2022/0034727 A1  Feb. 3, 2022

(51) Int. Cl.
*G01K 11/00*  (2006.01)
*F03D 7/02*  (2006.01)
(Continued)

(52) U.S. Cl.
CPC ............ *G01K 11/265* (2013.01); *F03D 7/028* (2013.01); *F03D 80/60* (2016.05); *G01K 1/024* (2013.01);
(Continued)

(58) Field of Classification Search
CPC ...... G01K 11/265; G01K 1/024; G01K 13/00; F03D 80/60; F03D 7/028; F05B 2270/1091; F05B 2270/303
(Continued)

(56) References Cited

U.S. PATENT DOCUMENTS

| 2005/0215294 A1 | 9/2005 | Eisenhower et al. |
| 2008/0084135 A1* | 4/2008 | Ramsesh ............. G01K 11/265 374/E11.012 |

(Continued)

FOREIGN PATENT DOCUMENTS

| CN | 101247517 A | * | 8/2008 |
| CN | 102859889 A | | 1/2013 |

(Continued)

OTHER PUBLICATIONS

17416657_2023-12-15_CN_106297122_A_H.pdf,Jan. 4, 2017.*
(Continued)

*Primary Examiner* — Gail Kaplan Verbitsky
(74) *Attorney, Agent, or Firm* — Volpe Koenig

(57) ABSTRACT

A detection system and a wind driven generator. The detection system includes: a plurality of passive wireless sensors respectively provided at the corresponding positions to be detected, which are used for obtaining detection signals of the positions to be detected; and a leaky coaxial cable provided along the position to be detected, wherein the leaky coaxial cable can emit electromagnetic waves to drive the plurality of passive wireless sensors, and can receive the detection signal sent by the passive wireless sensors. The detection system can save installation space, as well as reduce maintenance costs since there is no need to replace a battery regularly, and when conducting multi-point measurements, costs are reduced and the number of passive wireless sensors that the system can configure is increased.

18 Claims, 2 Drawing Sheets

(51) Int. Cl.
*F03D 80/60* (2016.01)
*G01K 1/024* (2021.01)
*G01K 11/26* (2006.01)
*G01K 13/00* (2021.01)

(52) U.S. Cl.
CPC ...... *G01K 13/00* (2013.01); *F05B 2270/1091* (2013.01); *F05B 2270/303* (2013.01)

(58) Field of Classification Search
USPC .................................. 374/120, 121, 117–119
See application file for complete search history.

(56) References Cited

U.S. PATENT DOCUMENTS

| | | | |
|---|---|---|---|
| 2012/0235847 A1 | 9/2012 | Viikari et al. | |
| 2013/0234831 A1 | 9/2013 | Sabesan et al. | |
| 2015/0022376 A1* | 1/2015 | Zhang | G01F 23/26 340/870.37 |
| 2017/0191883 A1* | 7/2017 | Wei | H01Q 13/203 |

FOREIGN PATENT DOCUMENTS

| | | | | | |
|---|---|---|---|---|---|
| CN | 203942273 | U | * | 11/2014 | |
| CN | 104737457 | A | | 6/2015 | |
| CN | 105490710 | | | 4/2016 | |
| CN | 105490710 | A | * | 4/2016 | .......... H04B 5/0018 |
| CN | 105491589 | A | | 4/2016 | |
| CN | 105606923 | A | * | 5/2016 | |
| CN | 205490539 | U | | 8/2016 | |
| CN | 205490540 | U | | 8/2016 | |
| CN | 103868621 | B | | 1/2017 | |
| CN | 106297122 | A | * | 1/2017 | .......... G08B 13/181 |
| CN | 106300208 | A | * | 1/2017 | ............ H02G 9/025 |
| CN | 106482845 | A | | 3/2017 | |
| CN | 206479261 | U | | 9/2017 | |
| CN | 107687909 | A | * | 2/2018 | |
| CN | 207937075 | U | | 10/2018 | |
| CN | 104820166 | B | * | 11/2018 | |
| CN | 109269558 | A | * | 1/2019 | |
| CN | 105698963 | B | * | 3/2019 | |
| CN | 208653666 | U | * | 3/2019 | |
| CN | 108121926 | B | | 9/2021 | |
| DE | 4005770 | A1 | * | 11/1990 | |
| EP | 407226 | A | * | 1/1991 | .......... H04B 5/0018 |
| EP | 2351992 | A1 | | 8/2011 | |
| JP | H07228252 | A | * | 8/1995 | |
| JP | 2004179756 | A | * | 6/2004 | |
| JP | 2008292362 | A | * | 12/2008 | |
| KR | 20000061355 | A | * | 10/2000 | |
| WO | WO-2017096489 | A1 | * | 6/2017 | |

OTHER PUBLICATIONS

17416657_2023-12-15_CN_203942273_U_H.pd,fNov. 12, 2014.*
17416657_2023-12-14_CN_105698963_B_H.pdf,May 25, 2016.*
CN-109269558-A 17416657_2023-12-14_CN_109269558_A_H.pdf,Jan. 25, 2019.*
17416657_2023-12-15_CN_202931315_U_H.pdf,Nov. 12, 2014.*
17416657_2023-12-14_CN_101247517_A_H.pdf,Aug. 20, 2008.*
17416657_2023-12-14_EP_407226_A_H.pdf, Jan. 9, 1991.*
17416657_2023-12-13_CN_111679227_A_H.pdf,Sep. 18, 2020.*
17416657_2023-12-14_CN_109269558_A_H.pdf,Jan. 25, 2019.*
17416657_2023-12-13_CN_208653666_U_H.pdf,Mar. 26, 2019.*
17416657_2023-12-14_CN_106300208_A_H.pdf,Jan. 4, 2017.*
17416657_2023-12-14_DE_4005770_A1_I.pdf,Nov. 29, 1990.*
17416657_2023-12-14_CN_104820166_B_H.pdf,Nov. 2, 2018.*
17416657_2024-01-22_CN_105490710_A_H.pdf,Apr. 13, 2016.*
17416657_2024-03-06_JP_2004179756_A_H.pdf,Jun. 24, 2004.*
17416657_2024-03-06_JP_H07228252_A_H.pdf,Aug. 29, 1995.*
European Search Report dated Jul. 1, 2022 for European Patent Application No. 18943524.1.

* cited by examiner

DETECTION SYSTEM AND WIND DRIVEN GENERATOR

CROSS-REFERENCE TO RELATED APPLICATIONS

This application is the U.S. National Phase of PCT Appln. No. PCT/CN2018/122426, filed Dec. 20, 2018, the entire disclosures of which is incorporated by reference herein.

TECHNICAL FIELD

The present disclosure relates to the field of measurement techniques, and in particular, to a detection system and a wind driven generator.

BACKGROUND

A wind driven generator is a power equipment that converts wind energy into mechanical work, such that the mechanical work drives a rotor to rotate to finally output an alternating current. The wind driven generator may be composed of static components and dynamic components. The static components may include a controller, an engine room, etc., and the dynamic components may include rotating devices such as a bearing, a gearbox, a generator, and a motor and the like.

During the operation of the wind driven generator, the temperature of each component changes. If the temperature of the gearbox, the generator, an oil-water cooler, a spindle or other components exceeds a certain range, the efficiency of power generation may be affected. Therefore, it is very important to monitor and control the temperature of the wind driven generator.

At present, in some scenarios, it is necessary to monitor the temperature information for all components in the wind driven generator through a separate system. However, it is difficult to monitor the temperature information for dynamic components while it is relatively easy to monitor the temperature information of the static components, and the temperature is usually detected by using wireless temperature measurement methods.

Related wireless temperature measurement methods mainly include the following:

1) A wireless temperature measurement unit with a battery is used to monitor and to output wireless temperature signals, and the wireless temperature measurement unit uses its own battery for power supply;

2) A wireless charging temperature measurement unit is used to monitor, output wireless temperature signals, and obtain power from a wireless charging unit;

3) A surface acoustic wave (SAW) temperature sensor or tag is used for monitoring. The SAW temperature sensor or tag is charged via electromagnetic waves, and the SAW temperature sensor or tag outputs wireless temperature signals through the electromagnetic waves.

The above-mentioned known methods have the following problems:

1) The wireless temperature measurement unit with a battery requires a large installation space, and the battery needs to be replaced regularly.

2) The wireless charging temperature measurement unit also requires a large installation space, and each temperature measurement unit requires a wireless charging unit and a signal processing unit. Therefore, for multi-point measurement, the system is very large and the cost is high.

3) A sensor chip of the SAW temperature sensor is very small, and can obtain power from electromagnetic waves, which is very suitable for the measurement of bearing temperature. However, there is relatively strict requirement on the distance between the SAW temperature sensor and an antenna (within 2 meters), and the signal is sensitive to the environmental arrangement. In addition, the driving and signal reading of the SAW temperature sensor are implemented one by one by means of serial communication via the antenna. This means that if there are a plurality of sensors and one antenna, it takes a relatively long time to implement the driving and signal reading of the SAW temperature sensor. The number of the antennas limits the number of the SAW temperature sensors in a system.

SUMMARY

In view of this, the present disclosure presents a detection system and a wind driven generator, which can save installation space, as well as reduce maintenance costs since there is no need to replace a battery regularly, and when conducting multi-point measurements, costs are reduced and the number of passive wireless sensors that the system can configure is increased.

In an aspect of the present disclosure, a detection system is provided, comprising:

a plurality of passive wireless sensors, wherein the plurality of passive wireless sensors are respectively provided on the corresponding positions to be detected, and are used for obtaining detection signals of the positions to be detected;

a leaky coaxial cable, wherein the leaky coaxial cable is provided along the position to be detected, and the leaky coaxial cable can emit electromagnetic waves to drive the plurality of passive wireless sensors and can receive the detection signals sent by the passive wireless sensors.

In one possible implementation, the leaky coaxial cable is of a coupled type.

In one possible implementation, the passive wireless sensors are surface acoustic wave (SAW) sensors.

In one possible implementation, the detection signal comprises temperature, and the passive wireless sensors are SAW temperature sensors.

In one possible implementation, the plurality of passive wireless sensors transmit the detection signal in a parallel and/or serial manner.

In one possible implementation, the system comprises a plurality of channels corresponding to a plurality of passive wireless sensors, wherein the plurality of passive wireless sensors transmit detection signals via the plurality of channels.

In one possible implementation, some passive wireless sensors of the plurality of passive wireless sensors share a common channel to transmit detection signals, and the passive wireless sensors sharing a common channel transmit detection signals in a time-division multiplexing manner.

In one possible implementation, distances between the plurality of passive wireless sensors and the leaky coaxial cable are equal.

In one possible implementation, the system further comprises:

a base station connected to a first end of the leaky coaxial cable, wherein the leaky coaxial cable transmits the received detection signal to the base station;

the base station demodulates the detection signal, and transmits the demodulated detection signal to a monitoring center.

In one possible implementation, the system further comprises:

a load connected to a second end of the leaky coaxial cable.

In one possible implementation, the system further comprises: a repeater, wherein the repeater is provided on the leaky coaxial cable and located between the base station and the load.

In one possible implementation, the system further comprises: a power divider, wherein the base station is connected to a plurality of leaky coaxial cables via the power divider.

In one possible implementation, the system further comprises: a direct current (DC) isolation device, wherein the DC isolation device is provided between the base station and the power divider, the end of the DC isolation device connected to the power divider is connected to ground.

In one possible implementation, the monitoring center is a remote computer, and the detection signal can be viewed through the remote computer.

In another aspect of the present disclosure, a wind driven generator comprising the above-mentioned detection system is provided.

By means of providing the passive wireless sensor at a position to be detected to obtain the detection signal of the position to be detected, the following advantages are achieved: no large installation space is required; there is no need to replace a battery regularly; there is no need to configure a plurality of wireless charging units and signal processing units, etc.; and costs are reduced when conducting multi-point measurements. In addition, a leaky coaxial cable is used to replace a conventional antenna, which is equivalent to providing a plurality of antennas without the need of a large installation space and extends the effective distance of the antennas, thereby increasing the number of passive wireless sensors in the system.

Therefore, the detection system according to the above-mentioned embodiments of the present disclosure can save installation space, as well as reduce maintenance costs since there is no need to replace a battery regularly, and when conducting multi-point measurements, costs are reduced and the number of passive wireless sensors that the system can configure is increased.

Other features and aspects of the present disclosure will become clear according to the following detailed descriptions of exemplary embodiments with reference to drawings.

BRIEF DESCRIPTION OF THE DRAWINGS

The drawings included in the specification and constituting a part thereof together with the specification illustrate exemplary embodiments, features, and aspects of the present disclosure, and are used to explain the principles of the present disclosure.

DETAILED DESCRIPTION

Figure 1:
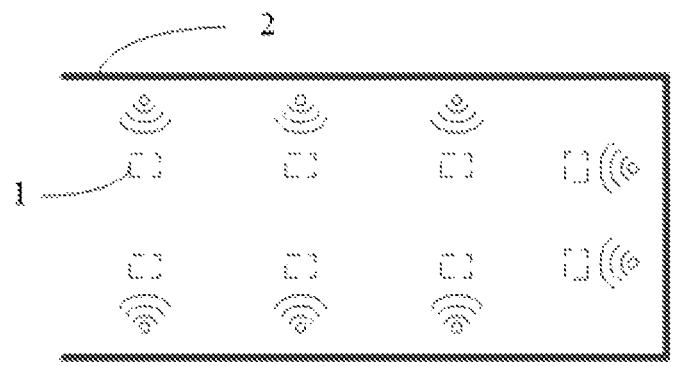
FIG. 1 is a schematic diagram of a detection system according to an embodiment of the present disclosure.

Various exemplary embodiments, features, and aspects of the present disclosure will be described in detail below with reference to the drawings. The same reference numerals in the drawings indicate elements with the same or similar functions. Although various aspects of the embodiments are shown in the drawings, the drawings are not necessarily drawn to scale unless otherwise specified.

The dedicated word "exemplary" herein means "serving as an example, embodiment, or being illustrative". Any embodiment described herein as "exemplary" is not necessarily construed as being superior to or better than other embodiments.

In addition, in order to better illustrate the present disclosure, numerous specific details are given in the following specific embodiments. Those skilled in the art will understand that the present disclosure can also be implemented without certain specific details. In some examples, the methods, means, elements, and circuits that are well known to those skilled in the art have not been described in detail, so as to highlight the gist of the present disclosure.

In order to solve the above-mentioned technical problems proposed by the present disclosure, the present disclosure provides a detection system, which can realize the detection of the temperature information for dynamic components in a wind driven generator without the need of a large installation space. As for multi-point measurement, the detection system can reduce costs, and can further reduce the induction time to improve the detection accuracy.

FIG. 1 is a schematic diagram of a detection system according to an embodiment of the present disclosure. As shown in FIG. 1, the system may comprise:

a plurality of passive wireless sensors 1, wherein the plurality of passive wireless sensors 1 are respectively provided on the corresponding positions to be detected, and are used for obtaining detection signals for the positions to be detected;

a leaky coaxial cable 2, wherein the leaky coaxial cable 2 is provided along the position to be detected, and the leaky coaxial cable 2 can emit electromagnetic waves to drive the plurality of passive wireless sensors 1, and can receive the detection signal sent by the passive wireless sensors 1.

The passive wireless sensors 1 do not need to be connected to a power supply and can be driven by external factors. In one example, the passive wireless sensors 1 of the present disclosure may be surface acoustic wave (SAW) sensors. It should be noted that, according to actual measurement needs, other passive wireless sensors 1, such as passive tags, may also be used, which is not limited in the present disclosure.

The detection signal may comprise temperature, and may also comprise other signals that need to be detected, such as humidity and pressure. Correspondingly, if the detection signal comprises temperature, the passive wireless sensors 1 may comprise SAW temperature sensors, which is not limited in the present disclosure.

In one example, the positions to be detected may be on a wind driven generator. The wind driven generator may comprise a plurality of positions to be detected, for example, positions on static components such as a controller and an engine room, or positions on dynamic components such as a bearing and a gearbox, which is not limited in the present disclosure. It should be noted that, positions described above are only some examples of the positions to be detected, and the positions to be detected can be selected according to different application scenarios or detection requirement sets.

The leaky coaxial cable 2 may be provided with a plurality of slots. Electromagnetic waves are longitudinally transmitted in the leaky coaxial cable 2 and radiated to the outside via the slots. Electromagnetic waves from outside can also be induced to the inside of the leaky coaxial cable via the slots and longitudinally transmitted. A plurality of slots are equivalent to a plurality of antennas.

The leaky coaxial cable 2 being provided along the positions to be detected may mean that the leaky coaxial cable 2 extends through each of the positions to be detected, or in other words, the leaky coaxial cable 2 is laid along the distribution of the positions to be detected at a preset distance from the positions to be detected. The preset distance may be a distance where a good communication effect between the passive wireless sensors 1 and the leaky coaxial cable 2 can be maintained, and the preset distance may be a range, which is not limited in the present disclosure.

In one possible implementation, the distance between the plurality of passive wireless sensors 1 and the leaky coaxial cable 2 may be equal, that is, the distance between any passive wireless sensor 1 and the leaky coaxial cable 2 may be a fixed value. The distance between the passive wireless sensor 1 and the leaky coaxial cable 2 may refer to the shortest distance between the passive wireless sensor 1 and the leaky coaxial cable 2. In this way, the communication process can be more stable.

As mentioned above, the passive wireless sensors 1 can be driven by the external factors. In the present disclosure, the leaky coaxial cable 2 can emit electromagnetic waves to drive the passive wireless sensors 1. Take a SAW temperature sensor as an example. The SAW temperature sensor may comprise a piezoelectric substrate, an interdigital transducer, a reflecting grating, and an antenna. Electromagnetic waves emitted by the leaky coaxial cable 2 can be received via the antenna and transmitted to the interdigital transducer, and the interdigital transducer excites surface acoustic waves through the inverse piezoelectric effect to implement the electrical/acoustic conversion. The surface acoustic waves propagate on the surface of the piezoelectric substrate, and are reflected by the reflecting grating back to the interdigital transducer. The interdigital transducer converts the reflected surface acoustic waves into excitation signals through the piezoelectric effect, and the excitation signals are transmitted to the leaky coaxial cable via the antenna in the form of electromagnetic waves.

When the temperature changes, the wavelength and velocity of the surface acoustic waves propagating along the surface of the piezoelectric substrate will change accordingly. In this case, the phase and frequency of the excitation signals transmitted via the antenna will change accordingly, and the temperature can be detected by detecting the phase and frequency of the excitation signals.

By means of providing the passive wireless sensor at a position to be detected to obtain the detection signal of the position to be detected, the following advantages are achieved: no large installation space is required; there is no need to replace a battery regularly; there is no need to configure a plurality of wireless charging units and signal processing units, etc.; and costs are reduced when conducting multi-point measurements. In addition, a leaky coaxial cable is used to replace a conventional antenna, which is equivalent to providing a plurality of antennas without the need of a large installation space and extends the effective distance of the antennas, thereby increasing the number of passive wireless sensors in the system.

Therefore, the detection system according to the above-mentioned embodiments of the present disclosure can save installation space, as well as reduce maintenance costs since there is no need to replace a battery regularly, and when conducting multi-point measurements, costs are reduced and the number of passive wireless sensors that the system can configure is increased.

Figure 2:
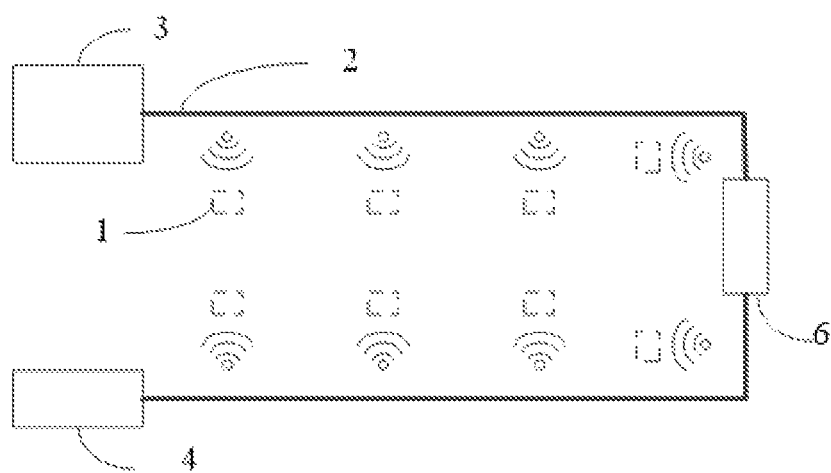
FIG. 2 is a schematic diagram of a detection system according to an embodiment of the present disclosure.

FIG. 2 is a schematic diagram of a detection system according to an embodiment of the present disclosure. As shown in FIG. 2, in one possible implementation, the system may further comprise:

a base station 3 connected to a first end of the leaky coaxial cable 2, wherein the leaky coaxial cable 2 transmits the received detection signal to the base station 3;

the base station 3 demodulates the detection signal, and transmits the demodulated detection signal to a monitoring center.

The detection system may further comprise a load 4, wherein the load 4 may be connected to a second end of the leaky coaxial cable 2. The load 4 can prevent electromagnetic wave signals sent by the base station 3 from being reflected to the base station 3 and causing interference.

As described above, the base station 3 may have communication and data processing functions, executing the following operations: transmitting electromagnetic waves, receiving the detection signal transmitted by the leaky coaxial cable 2, demodulating the detection signal, and transmitting the demodulated detection signal to the monitoring center, etc. The communication between the base station 3 and the monitoring center can be implemented through a data interface, and the data interface may be RS485 or RJ45. The monitoring center may be a remote computer, and the detection signal can be viewed through the remote computer. For example, the remote computer may comprise a display device. An administrator can further operate via the display device of the remote computer to control the base station 3, and obtain the detection signal of a position to be detected that he/she wants to view through the base station 3, thus reducing the response time.

In one possible implementation, each passive wireless sensor (SAW temperature sensor) may have a unique radio frequency identification (RFID), and both a detection signal and a demodulated detection signal can carry the RFID of the passive wireless sensor.

In this implementation, a plurality of passive wireless sensors can transmit detection signals in a serial communication manner. For example, the plurality of passive wireless sensors can transmit detection signals in a time-division multiplexing manner, for example, transmitting detection signals sequentially in turn.

The base station 3 can identify, through the RFID, detection signals transmitted by a plurality of different passive wireless sensors. The relationship between the RFID of the passive wireless sensor and the position to be detected can be pre-stored in the monitoring center. The monitoring center can determine temperature and other information for the position to be detected through the RFID of the passive wireless sensor carried in the demodulated detection signal and the pre-stored relationship between the RFID of the passive wireless sensor and the position to be detected. After determining the temperature and other information for the position to be detected, the remote computer can display the corresponding relationship between the position to be detected and the temperature thereof through the display device.

In another possible implementation, the plurality of passive wireless sensors 1 correspond to a plurality of channels, wherein the plurality of passive wireless sensors 1 transmit detection signals via the plurality of channels.

In one example, different working frequencies can be set for a plurality of passive wireless sensors 1 in the system. A plurality of passive wireless sensors can transmit detection signals in a parallel communication manner, that is, each of the passive wireless sensors 1 has its own unique working frequency, that is, each of the passive wireless sensors 1 corresponds to one channel, and transmits the detection signal to the base station 3 through the channel. In this way, the plurality of passive wireless sensors can transmit the detection signals simultaneously, such that a plurality of signals are detected in less time and the detection efficiency is improved.

In one possible implementation, the leaky coaxial cable 2 may be of a coupled type. The use of coupled leaky coaxial cables can make full use of broadband capacity, so as to realize communication with more passive wireless sensors.

In another example, the plurality of passive wireless sensors may transmit detection signals in a parallel and serial manner.

For example, some passive wireless sensors of the plurality of passive wireless sensors share a common channel to transmit detection signals, and the passive wireless sensors sharing a common channel may transmit detection signals in a time-division multiplexing manner. For example, the system comprises a total of ten passive wireless sensors, wherein the working frequency of three passive wireless sensors 11 is frequency 1 (corresponding to channel 1), and the working frequency of four passive wireless sensors 12 is frequency 2 (corresponding to channel 2), and the working frequencies of three passive wireless sensors 13, 14 and 15 are frequency 3 (corresponding to channel 3), frequency 4 (corresponding to channel 4) and frequency 5 (corresponding to channel 5), respectively. Then, the three passive wireless sensors 11 transmit detection signals through channel 1 in a time-division multiplexing manner, the four passive wireless sensors 12 transmit detection signals through channel 2 in a time-division multiplexing manner, and the passive wireless sensors 13, 14 and 15 can transmit detection signals through channel 3, channel 4 and channel 5 simultaneously.

In one possible implementation, as shown in FIG. 2, the system may further comprise: a repeater 6, wherein the repeater 6 is provided on the leaky coaxial cable 2, and located between the base station 3 and the load 4. The repeater 6 is used to increase the power of electromagnetic waves transmitted in the leaky coaxial cable 2.

Electromagnetic waves have longitudinal attenuation while being transmitted in the leaky coaxial cable 2, and the leaky coaxial cable further has coupling losses. Therefore, as the transmission distance increases, power attenuation occurs, and the transmission distance of a single leaky coaxial cable is usually less than 400 meters. Providing a repeater on the leaky coaxial cable can extend the transmission distance, such that in the case of a long transmission distance, the communication with a plurality of passive wireless sensors 1 can still be implemented.

In one possible implementation, the system may further comprise: a power divider 5, wherein the base station 3 is connected to a plurality of leaky coaxial cables via the power divider 5.

Figure 3:
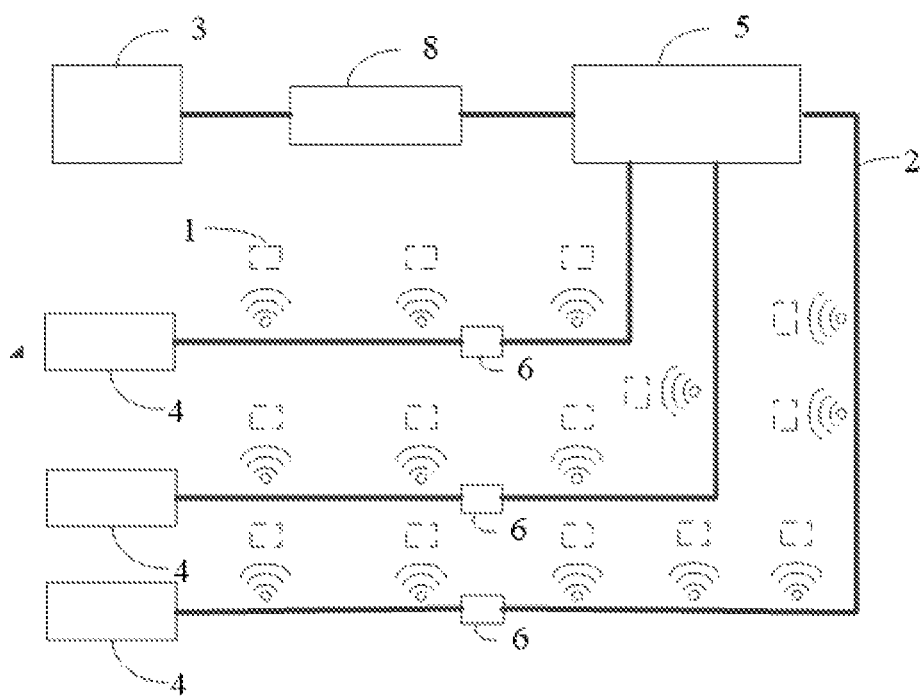
FIG. 3 is a schematic diagram of a detection system according to an embodiment of the present disclosure.

FIG. 3 is a schematic diagram of a detection system according to an embodiment of the present disclosure. As shown in FIG. 3, the detection system may comprise a plurality of leaky coaxial cables 2, wherein each of the leaky coaxial cables 2 has a first end connected to a power divider 5 and a second end connected to a load 4. The power divider 5 can divide the energy of one electromagnetic wave emitted by a base station 3 into a plurality of electromagnetic waves with equal or unequal energy, which are output to the plurality of leaky coaxial cables 2 respectively. In one possible implementation, each leaky coaxial cable 2 may further be provided with a repeater 6.

In one possible implementation, the system may further comprise: a DC (Direct Current) isolation device 8, wherein the DC isolation device 8 is provided between the base station 3 and the power divider 5, and the end of the DC isolation device 8 connected to the power divider 5 is connected to ground 7. The DC isolation device can effectively isolate the potential between the input, the output, a power supply and ground to keep the entire system safe.

The present disclosure further provides a wind driven generator, comprising the above-mentioned detection system. Through the above-mentioned detection system, temperature and other information for all devices in the wind driven generator can be monitored.

The embodiments of the present disclosure have been described above, and these descriptions are exemplary rather than exhaustive, and are not limited to the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

LIST OF REFERENCE NUMERALS

1 Passive wireless sensor
2 Leaky coaxial cable
3 Base station
4 Load
5 Power divider
6 Repeater
7 Ground
8 DC isolation device

The invention claimed is:

1. A detection system, comprising:
a plurality of passive wireless sensors, wherein the plurality of passive wireless sensors are respectively provided at corresponding positions to be detected, and are configured for obtaining detection signals of the positions to be detected;
a leaky coaxial cable provided along the positions to be detected, and the leaky coaxial cable is configured to emit electromagnetic waves to drive the plurality of passive wireless sensors, and is configured to receive the detection signals sent by the passive wireless sensors;
a base station connected to a first end of the leaky coaxial cable, wherein the leaky coaxial cable is configured to transmit the received detection signal to the base station and the base station is configured to demodulate the detection signals and transmit the demodulated detection signals to a monitoring center; and
a load connected to a second end of the leaky coaxial cable;
wherein distances between each of the plurality of passive wireless sensors and the leaky coaxial cable are equal.

2. The detection system according to claim 1, wherein the load is configured to prevent electromagnetic wave signals sent by the base station from being reflected to the base station and causing interference.

3. The detection system according to claim 1, wherein the leaky coaxial cable is of a coupled type.

4. The detection system according to claim 1, wherein the passive wireless sensors are surface acoustic wave (SAW) sensors.

5. The detection system according to claim 1, wherein the detection signals include a temperature, and the passive wireless sensors are SAW temperature sensors.

6. The detection system according to claim 1, wherein the plurality of passive wireless sensors are configured to transmit the detection signals in a parallel or serial manner.

7. The detection system according to claim 6, wherein the plurality of passive wireless sensors correspond to a plurality of channels, and the plurality of passive wireless sensors are configured to transmit the detection signals via the plurality of channels.

8. The detection system according to claim 7, wherein some of the wireless sensors of the plurality of passive wireless sensors are passive wireless sensors and share a common channel to transmit detection signals, and the passive wireless sensors sharing the common channel transmit detection signals in a time-division multiplexing manner.

9. The detection system according to claim 1, further comprising: a repeater on the leaky coaxial cable located between the base station and the load.

10. The detection system according to claim 9, further comprising: a power divider, and the leaky coaxial cable comprises a plurality of leaky coaxial cables, and the base station is connected to the plurality of leaky coaxial cables via the power divider.

11. The detection system according to claim 10, further comprising: a direct current (DC) isolation device between the base station and the power divider, and an end of the DC isolation device connected to the power divider is connected to ground.

12. The detection system according to claim 1, wherein the monitoring center is a remote computer, and the detection signal is viewable through the remote computer.

13. A wind driven generator comprising a detection system according to claim 1.

14. A detection system, comprising:
a plurality of passive wireless sensors adapted to be provided at corresponding positions to be detected that are configured for obtaining detection signals of the positions to be detected;
a coaxial cable provided along the positions to be detected, and the coaxial cable includes a plurality of slots such that electromagnetic waves are adapted to be longitudinally transmitted in the coaxial cable and radiated to outside via the slots to drive the plurality of passive wireless sensors, and electromagnetic waves of the detection signals from outside the coaxial cable are able to be induced to an inside of the coaxial cable via the slots and longitudinally transmitted;
wherein distances between each of the plurality of passive wireless sensors and the coaxial cable are equal.

15. The detection system according to claim 14, wherein the coaxial cable is a coupled type.

16. The detection system according to claim 14, wherein the passive wireless sensors are surface acoustic wave (SAW) sensors.

17. The detection system according to claim 14, wherein the detection signals include a temperature, and the passive wireless sensors comprise temperature sensors.

18. The detection system according to claim 14, wherein the plurality of passive wireless sensors are configured to transmit the detection signals in parallel.

* * * * *